US010024766B2

(12) United States Patent
Botello et al.

(10) Patent No.: US 10,024,766 B2
(45) Date of Patent: Jul. 17, 2018

(54) DUAL-AXIS TRIGGER FOR TIRE TESTING

(71) Applicant: Bridgestone Americas Tire Operations, LLC, Nashville, TN (US)

(72) Inventors: Sergio A. Botello, Del Rio, TX (US); Jacob R. Kidney, Wadsworth, OH (US); Juan C. Dehoyos, Del Rio, TX (US); Gregory A. Rasor, Cuyahoga Falls, OH (US); David O. Stalnaker, Hartville, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 143 days.

(21) Appl. No.: 15/198,669

(22) Filed: Jun. 30, 2016

(65) Prior Publication Data

US 2017/0003199 A1 Jan. 5, 2017

Related U.S. Application Data

(60) Provisional application No. 62/186,450, filed on Jun. 30, 2015.

(51) Int. Cl.
*G01M 17/02* (2006.01)
(52) U.S. Cl.
CPC .................. *G01M 17/027* (2013.01)
(58) Field of Classification Search
None
See application file for complete search history.

(56) References Cited

U.S. PATENT DOCUMENTS

| 5,753,808 | A  | * | 5/1998  | Johnson ................ E01C 23/01 |
|           |    |   |         | 73/146                             |
| 6,446,501 | B1 |   | 9/2002  | Domeck et al.                      |
| 7,617,721 | B2 |   | 11/2009 | McKeown et al.                     |
| 7,826,969 | B2 |   | 11/2010 | Hein et al.                        |
| 8,639,438 | B2 |   | 1/2014  | Martin et al.                      |
| 2004/0244463 | A1 | | 12/2004 | Dale, Jr.                          |
| 2005/0188755 | A1 | | 9/2005  | Cargould et al.                    |
| 2006/0130567 | A1 | | 6/2006  | Ben-David                          |
| 2014/0088801 | A1 | | 3/2014  | Bartonek                           |

FOREIGN PATENT DOCUMENTS

WO   WO2014134719   9/2014

* cited by examiner

*Primary Examiner* — Andre Allen

(57) ABSTRACT

Various embodiments relate to methods, systems, devices, and non-transitory media for increasing repeatability and reliability of tire testing trials including one or more of the following: capturing position data from a position sensor, wherein the capture of the position data is indicative of alignment with the desired testing area along the first axis; determining whether the position data indicates that the testing wheel is aligned with the desired testing area along a second axis that is perpendicular to the first axis, and when the position data indicates that the testing wheel is aligned with the desired testing area along a second axis, effecting initiation of a testing event.

20 Claims, 5 Drawing Sheets

DUAL-AXIS TRIGGER FOR TIRE TESTING

TECHNICAL FIELD

Various embodiments disclosed herein relate generally to testing apparatuses and, more particularly but not exclusively, vehicles and traction trailers for testing tire characteristics.

BACKGROUND

Tire manufacturers frequently conduct extensive real-world testing to understand real-world characteristics of (or influenced by) new tires. For example, characteristics such as tire friction, vehicle stopping distance, blowout handling, or noise production are often best-gauged by mounting the tire to the wheel of a vehicle or trailer and gathering data at a test track. For example, one form of friction test involves mounting a tire to be tested to a wheel of a traction trailer, driving at a predetermined testing speed (e.g., 40 miles per hour), applying a brake to the wheel for a short period of time (e.g., about 1 second), and measuring various forces on the wheel during the braking period. Such data resulting from multiple trials may be compiled into a "mu-slip" curve indicative of how tire friction varies with the degree to which the tire skids along the road. More specifically, the mu-slip value indicates the amount of braking force that is generated by the tire as its rotational velocity is reduced relative to the speed of the trailer and vehicle. Such mu-slip curves provide a useful metric in comparing different tires.

SUMMARY

A brief summary of various embodiments is presented below. Some simplifications and omissions may be made in the following summary, which is intended to highlight and introduce some aspects of the various embodiments, but not to limit the scope of the invention. Detailed descriptions of a preferred embodiment adequate to allow those of ordinary skill in the art to make and use the inventive concepts will follow in later sections.

Various embodiments described herein relate to a device for facilitating tire testing, the device including: a position sensor configured to capture position data when a testing wheel is aligned with a desired testing area along a first axis; a processor in communication with the position sensor, wherein the processor is configured to: receive the position data from the position sensor when the testing wheel is aligned with the desired testing area along the first axis, determine whether the position data indicates that the testing wheel is aligned with the desired testing area along a second axis that is perpendicular to the first axis, and when the position data indicates that the testing wheel is aligned with the desired testing area along a second axis, effect initiation of a testing event.

Various embodiments described herein relate to a method performed by a device for facilitating tire testing, the method including: capturing position data from a position sensor, wherein the capture of the position data is indicative of alignment with the desired testing area along the first axis; determining whether the position data indicates that the testing wheel is aligned with the desired testing area along a second axis that is perpendicular to the first axis, and when the position data indicates that the testing wheel is aligned with the desired testing area along a second axis, effecting initiation of a testing event.

Various embodiments described herein relate to a non-transitory machine-readable storage medium encoded with instructions for execution by a device for facilitating tire testing, the non-transitory machine-readable storage medium including: instructions for receiving position data from a position sensor when a testing wheel is aligned with a desired testing area along a first axis, wherein the capture of the position data is indicative of alignment with the desired testing area along the first axis; determining whether the position data indicates that the testing wheel is aligned with the desired testing area along a second axis that is perpendicular to the first axis, and instructions for, when the position data indicates that the testing wheel is aligned with the desired testing area along a second axis, effecting initiation of a testing event.

Various embodiments are described wherein the position sensor includes: a laser emitter positioned to impinge a laser beam upon a stationary reflective marker when the testing wheel is traveling along a track containing the desired testing area, and aligned with a desired testing area along a first axis; and a laser sensor positioned to sense the laser beam when the laser beam is reflected by the stationary reflective marker.

Various embodiments are described wherein the position sensor includes a global positioning system (GPS) device.

Various embodiments are described wherein the testing event is a braking event whereby brakes are applied to the testing wheel.

Various embodiments are described wherein the testing event is a data capture event, whereby data is captured from at least one sensor associated with the testing wheel.

Various embodiments are described wherein, in effecting initiation of a testing event, the processor is configured to transmit an instruction to a second device to initiate the testing event.

Various embodiments are described wherein the second device is a controller of a traction trailer including the testing wheel.

Various embodiments are described wherein the device is a vehicle further including: the testing wheel; and a braking system, wherein the second device is an on-vehicle braking actuator.

Various embodiments are described wherein the second device is a pass-by noise testing system and the testing event is a recording event, whereby the pass-by noise testing system activates at least one stationary microphone.

Various embodiments are described wherein, in determining whether the position data indicates that the testing wheel is aligned with the desired testing area along a second axis that is perpendicular to the first axis, the processor is configured to: determine a value range associated with the desired testing area; and determine whether the position data falls within the value range.

Various embodiments are described as additionally including a memory device that stores a correlation between the value range and an identifier of the desired testing area and, in determining a value range associated with the desired testing area, the device is configured to retrieve the value range from the memory device.

Various embodiments are described wherein, in determine a value range associated with the desired testing area, the processor is configured to receive, from a user, a pair of values representing the value range.

Various embodiments are described as additionally including a driver display device, wherein: the position sensor is further configured to provide approach position data over a distance as the testing wheel approaches the desired testing area; and the processor is further configured to: determine whether the approach position data indicates that the testing wheel is aligned with the desired testing area along the second axis, and provide an indication to the driver via the driver display device whether the testing wheel is aligned with the desired testing area along the second axis.

Various embodiments are described wherein the position sensor includes: a laser emitter positioned to impinge a laser beam upon a stationary reflective rail when the testing wheel is traveling along a track containing the desired testing area, and approaching alignment with a desired testing area along a first axis; and a laser sensor positioned to sense the laser beam when the laser beam is reflected by the stationary reflective rail.

Various embodiments are described wherein the device is a vehicle to which a traction trailer including the testing wheel is capable of attachment.

Various embodiments are described wherein the testing wheel is configured to travel with the position sensor.

BRIEF DESCRIPTION OF THE DRAWINGS

In order to better understand various embodiments, reference is made to the accompanying drawings, wherein.

To facilitate understanding, identical reference numerals have been used to designate elements having substantially the same or similar structure or substantially the same or similar function.

DETAILED DESCRIPTION

Figure 1:
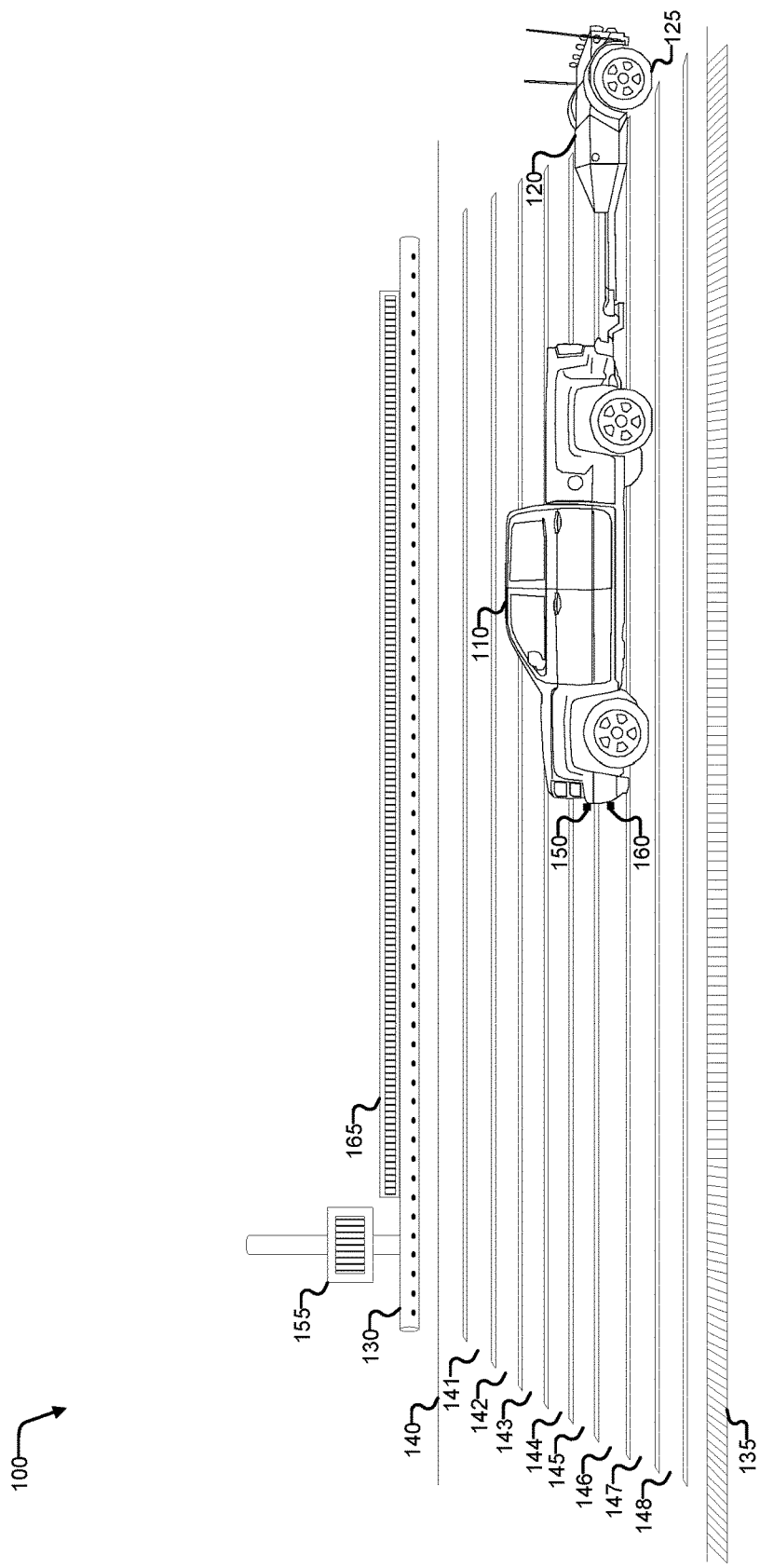
FIG. 1 illustrates an example of a system for testing tire traction.

The description and drawings presented herein illustrate various principles. It will be appreciated that those skilled in the art will be able to devise various arrangements that, although not explicitly described or shown herein, embody these principles and are included within the scope of this disclosure. As used herein, the term, "or" refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

Various forms of tire testing, including forms of traction testing, involve testing a tire in motion over multiple trials. In order to isolate the characteristics being tested in the resulting data, it is desirable to maintain the non-tested variables as constant as possible. When the vehicle and tire are in motion, however, it is often difficult to ensure that the test is performed at the same location each time. For example, if the driver is responsible for triggering the test on each pass, the testing location may vary by multiple feet on each pass. Further, even if multiple trials for a single tire are performed at relatively the same location on the track, it remains possible that the tests of a different tire (e.g., a reference tire) may have been performed at a different location. Due to the varying position of the test, the characteristics in the test track may vary from trial to trial (or test to test), thereby degrading the accuracy of the results or the comparability to other results.

To reduce the effect of track surface variability on traction tests, it would be desirable to provide a system that is capable of performing the traction test at the same location for each trial. Similarly, for other types of tests where a tire to be tested is in motion, it would be desirable to provide a system that performs such tests at the same location for each trial. Additionally, tests similar to those described herein are often performed for the purpose of ascertaining characteristics of a road surface, rather than a tire; in some such tests it may also be desirable to ensure that the test is performed at the same location each trial. As used herein, the term "tire testing" will be understood to refer to any testing of a tire itself as well as testing of other structure's characteristics with respect to a tire in motion such as, for example, a road surface's friction properties or a sound barrier's insulation properties against tire noise.

To provide such a system, various embodiments described herein utilize a position sensor, such as one or more laser emitters and sensors, to ensure that a tire to be tested is in a desired location before initiating testing. As the tire travels through or near the desired area for testing, data from the position sensor is used to determine whether the tire is indeed located within the testing area. If so, testing is initiated; otherwise, the test is not initiated and the driver may be informed that the test was not performed because the tire did not pass through the desired testing area. The driver may then attempt the test again by taking another pass. Various alternative and additional beneficial features will be described below.

While various embodiments explained in detail herein are described with respect to traction testing, it will be apparent that these systems and methods may be adapted to other tests. Various modifications to enable adaptation to such other tests will be apparent.

FIG. 1 illustrates an example of a system 100 for testing tire traction. As shown, a vehicle 110 (such as a truck or other automobile) tows a traction trailer 120 to which a tire 125 to be tested is mounted. The traction trailer 120 includes components configured to perform functions related to testing the tire such as a brake caliper, brake pads, and disc (not shown) for slowing the rotational velocity of the tire 125 and thereby causing the tire 125 to brake, sensors (e.g., load cells for measuring vertical load on the tire 125 and braking force generated by the tire 125, or an encoder to measure rotational velocity of the tire) (not shown) for gathering data regarding the tire's performance while the brakes are applied, and a controller for coordinating these functions into a repeatable test. Various components and arrangements thereof for providing a traction trailer 120 for testing a tire 125 will be apparent.

The vehicle 110 is driven by a human driver and tows the trailer 120 to put the tire 125 into motion for purposes of the traction test. As such, the vehicle 110 may be virtually any vehicle, such as a stock truck with a ball hitch. According to various embodiments, the vehicle 110 is also equipped with various sensors and a controller for facilitating the test performed by the traction trailer 120, as will be described in greater detail below.

It will be apparent that various alternative arrangements may be used to provide testing functionality similar to that described herein. For example, the appropriate testing systems from the traction trailer 120 may be integrated into the vehicle 110 and the tire 125 may be mounted to one of the four wheels of the vehicle. Alternatively, the tire 125 may be mounted to a third wheel on the trailer 125 or a fifth wheel loaded through the floor of the vehicle 110 (e.g., in the case of a "traction van"). As another example, the vehicle 110 may be a remote controlled or autonomous vehicle. Similarly, the traction trailer 120 may not be a trailer per se and, instead, may include an engine, motor, or other means for propulsion. In such an embodiment, the traction trailer may carry a human driver, may be remote controlled, or may be autonomously driven by the onboard controller. Various additional variations will be apparent.

To facilitate testing of the tire on a wet surface, the system includes a water outlet pipe 130 and drain 135 located on opposite sides of a length of track 140. The pipe 130 includes multiple outlets that, when water flows through the pipe 130, the water is sprayed onto the track 140. The water flows across the track 140 (which may be slightly inclined to facilitate water movement) and into the drain 135 for collection and potential reuse.

The track is divided into multiple lanes 141, 142, 143, 144, 145, 146, 147, 148 for the purposes of testing. As shown, paint is applied to the track 140 to identify the boundaries between the lanes 141-148. Such paint may aid the driver in positioning the tire 125 within a desired lane for testing. However, in various alternative embodiments, the track may not include any visible indication of the lanes 141-148 and, instead, the lanes may be defined purely digitally based on sensor data (as will be described below). Further, in some such embodiments, driver feedback may be provided by a controller of the vehicle via a driver display (as will be described below).

For the purposes of defining lanes and desired testing areas, two axes may be ascribed to the track 140. An x-axis may be defined as running along the track (e.g., from left to right in FIG. 1). X-axis alignment may therefore be taken to indicate that the tire has arrived the desired position along the length of the track in its travel (though may not necessarily be aligned with the desired lane). Conversely, a y-axis may be defined as running perpendicular to the x-axis and from one side of the track to the other. Y-axis alignment may therefore be taken to indicate whether or not the tire is currently within the desired testing lane (though may not necessarily have reached the desired position along the length of the track).

In some embodiments the lanes 141-148 are each between one and two feet wide and define (along one axis) an area that may be used for testing of a tire. As such, each lane may be provided with different surface characteristics for performing different tests. For example, lanes 141-144 may include patches of asphalt of varying ages, varying mix, or varying construction/design while lanes 145-148 may include patches of various types of concrete such that traction on various road types may be tested. Alternatively, the lanes 141-148 may be initially paved with roughly the same surface characteristics and may be subdivided simply for the purpose of correlating test data to the particular testing area.

It will be apparent that the lanes 141-148 may vary in other embodiments. Some embodiments may include more or fewer lanes than those illustrated. Further, in some embodiments, the lanes may be narrower or wider than illustrated. For example, some embodiments may include a single lane that is 12 feet wide and, as such, approximates a standard lane for road driving. Further, in some embodiments, the lanes 141-148 may vary in width, length, surface characteristics, etc.

In some embodiments, the lanes 141-148 demarcated by paint lines may not exactly correspond to lanes defined for the purposes of testing. For example, while the lanes 141-148 may be 12 feet wide, the lanes defined for testing by the controller device of the vehicle 110 or trailer 120 may be one or two feet wide and located within the lane where the tire to be tested 125 is expected to travel when the vehicle 110 is traveling within the associated physical lane 141-148. As used herein, unless otherwise indicated as one or more of lanes 141-148 or as a "physical lane," the term "lane" will be understood to refer to a length of track defined and recognized by a controller device of the vehicle 110 or trailer 120.

To facilitate making a determination of whether the tire 125 is properly aligned with a desired testing area prior to test initiation, the system 100 includes a position sensor 150. As shown, the position sensor 150 is mounted to the front of the vehicle; it will be apparent, however, that the position sensor 150 may be located anywhere on or within the vehicle 110 or trailer 120 so long as the function of the position sensor 150 is not prevented by its location.

In the illustrated embodiment, the position sensor includes a laser emitter and sensor 150 (shown together as a single black box). A stationary reflective marker 155 is positioned at a desired location beside the track where the laser emitter 150 will impinge upon the reflective surface 155 when the tire 125 is aligned with a desired testing area along an x-axis (but not necessarily along the y-axis). In other words, when the laser emitter 150 passes the reflective marker 155, the laser beam is reflected back into the laser sensor, thereby indicating that the vehicle (and consequently, the tire 125) has reached a predefined position along the x-axis of the track 140. As such, the reflective marker 155 is placed, prior to the test, at a location along the side of the track corresponding to the location along the x-axis of the track that includes the desired testing area. For example, the marker 155 may be placed along the x-axis at a distance from the desired testing area that is equal to the distance between the laser emitter and sensor 150 and the tire 125. It will be apparent that various additional or alternative sensors to laser sensors may be used to serve as a position sensor such as, for example, ultrasonic sensors, other optical sensors, global positioning system (GPS) sensors, cameras, etc. Various modifications to enable such other sensor types to provide data indicative of alignment along one axis (x, y, z, etc.) that is useful to determine alignment on another axis (whether through hardware, software, or a combination thereof) will be apparent.

In some embodiments, the sensor 150 may include some stationary components and some components that travel with the tire to be tested 125. For example, because it is used in conjunction with the laser sensor 150 to perform position measurements, the reflective target 155 may be considered a stationary part of an overall sensor. As another example, in some embodiments, the positions of the laser sensor and reflective marker may be reversed, wherein the laser sensor is stationary and the reflective marker is attached to the vehicle 110 or trailer 120; in such an embodiment, the overall position sensor may include the laser emitter, the laser sensor, the reflective marker, and the controller interface of the vehicle 110 or trailer 120 that receives sensed data from the stationary laser sensor. In another embodiment, a different type of stationary sensor such as, for example, a camera, may be used to judge whether the tire 125 is within a desired testing area according to the methods described herein and report sensed data to a controller of the vehicle 110 or trailer 120 via a data connection. In embodiments where a stationary sensor reports sensed data to a controller traveling with the tire 125, the controller interface that receives the sensed data may also be considered to be part of the position sensor. As such, in each of these examples, the position sensor may be said to move with the tire 125 even though some components are stationary (or otherwise do not travel with the tire 125). Various additional modifications will be apparent.

Upon receiving position data indicative of x-axis alignment with the desired testing area (e.g., upon receiving any data from the laser sensor 150), the controller of the vehicle interprets the reported data to determine whether the tire 125 is also aligned with the desired testing area along the y-axis of the track (e.g., whether the tire is located within the appropriate lane). The term "position data" as used herein will be understood to refer to any information that may be used to infer, at least partially, the position of the vehicle including, as in the present example, information conveying a measured distance from the marker 155. For example, the voltage reported by the laser sensor 150 may be proportional to (and thereby indicative of) the distance between the sensor 150 and the marker 155. If the voltage or distance falls within a predetermined range associated with the desired lane or lateral position, the vehicle 110 controller determines that the tire 125 is also properly aligned along the y-axis of the track and initiates a testing event. For example, the controller of the vehicle 110 may transmit an instruction to the controller of the trailer 120 indicating that the braking test should be performed. If the voltage or distance falls outside the predetermined range, the controller of the vehicle 110 determines that the tire 125 is not properly aligned and refrains from initiating any testing events. In some embodiments, the controller of the vehicle 110 may also report testing failure to the driver via a driver interface so that the driver knows to reattempt the test.

In various embodiments, while the marker 155 is stationary during the test, it may be movable along the x-axis of the track 140 to account for differences in position sensor placement or different vehicles 110 or trailers 120. The marker 155 may also be movable to enable selection of alternate testing areas along the x-axis of the track. In some embodiments, different testing areas along with the x-axis of the track may be defined by deploying multiple markers 155. For example, a first marker may be deployed at a first height and a second marker may be deployed at a second height. Thereafter, the vertical position of the laser emitter and sensor 150 may be adjusted to impinge on one such marker but not the other, thereby selecting the x-axis position associated with one of the multiple markers. As another alternative, multiple markers may be vertically-aligned with each other such that the laser sensor 150 will sense a reflection from each marker that is passed. To select a location along the track 140 x-axis for the desired testing area, a user may indicate a number of the marker to be used as the x-axis trigger by, for example, specifying the marker number or specifying a testing area which is previously correlated in memory to the marker number. Then, during the test, the processor may count the number of separate markers passed (as sensed by the laser sensor 150), and determine that the appropriate x-axis alignment has been reached when a number of markers equal to the specified marked number has been sensed.

In some embodiments, the marker 155 is alternatively or additionally movable along the y-axis of the track 140. For example, the marker 155 may be moved further away from the side of the track 140. Such functionality may provide an alternative method for lane selection. In some such embodiments, instead of matching sensed position data to a range uniquely associated with a desired lane, the controller of the vehicle 110 may compare the position data to a static range defining predetermined distance(s) away from the marker. As such, moving the marker 155 closer to or further away from the side of the track 155 will have the effect of changing the selected lane on the track wherein testing events will be triggered. Alternatively, other values may be compared to the position data. For example, a single distance value may be compared to the position data and, if the difference between the two values are within an acceptable threshold, the testing events may be triggered.

Another feature that the system 100 may include is y-axis alignment reporting during the approach to x-axis alignment. As shown, the system 100 includes an additional laser emitter and sensor 160 mounted to the vehicle 110, a reflective rail 165 positioned alongside the track 140, and a driver display (not shown) inside the vehicle. As with the primary laser emitter and sensor 150, the additional laser emitter and sensor 160 may be mounted anywhere on the vehicle 110 or trailer 120, may be a sensor other than a laser sensor, or may take on any of the variations described with respect to the primary laser emitter and sensor 150. The reflective rail 165, like the reflective marker 150, may include any surface characteristics effective to reflect a laser beam back to the sensor 160. As shown, the rail 165 is located at a different height from the reflective marker 155 (above or below) so that the reflective rail 165 does not reflect the laser beam of the primary sensor 150 and falsely initiate a trigger based on an incorrect determination of x-axis alignment. It will be apparent that the data sensed due to reflection off of the rail 165 may be used for purposes in addition or alternative to reporting alignment to a driver. For example, as noted above, in some alternative embodiments, the vehicle 110 or trailer 120 may be an autonomous vehicle. In some such embodiments, alignment data sensed off of the rail 165 may be used as input into the autonomous driving program. Various additional embodiments will be apparent.

As the vehicle 110 and trailer 120 approaches the marker 155, the secondary sensor 160 emits a laser beam onto the rail 165 and senses the reflected beam. From the sensed data, in a manner similar to that described with respect to the primary sensor 150, the vehicle 110 controller determines whether the tire 125 is currently aligned along the y-axis (even though it may not yet be aligned along the x-axis) with the desired testing area. The controller also keeps the driver display updated with an indication of whether the tire 125 is currently aligned along the y-axis. For example, the display may indicate to the driver whether the tire 125 is currently aligned or whether the driver should adjust the driving path left or right to achieve alignment. In some embodiments, the display may indicate how far the driver should adjust to achieve alignment. While shown as two separate objects, in some embodiments the marker 155 and rail 165 may be a single reflective object. For example, the rail may simply include an upward projection at one end to form the marker 155 (e.g. to form the shape of an "L").

While two separate laser emitters and sensors 150, 160 are shown, they may together constitute a single "position sensor" system along with any additional position sensing hardware. In some alternative embodiments, approach alignment reporting may be provided without use of a secondary laser emitter and sensor 160. Various modifications to implement such functionality will be apparent. For example, the marker 155 and rail 165 may be aligned vertically such that the laser emitter and sensor 150 may impinge upon and sense reflections from both. The marker 155 and rail 165 may be positioned with a gap between the reflective surfaces horizontally such that as the sensor 150 passes from the rail 165 to the marker 155, there is a period of time where the sensor 150 does not pick up any reflection. As such, the controller of the vehicle may use this gap to differentiate between the rail 165 and the marker 155 for the purposes of determining x-axis alignment. As another embodiment, the marker 155 and rail 165 may be vertically aligned and not provided with any gap therebetween. Instead, the marker 155 and rail 165 may include different reflective characteristics from each other. The vehicle 110 controller may then interpret the change in characteristics (e.g., through a sudden change in sensed data) as an indication of x-axis alignment. As yet another example, the marker 155 may be omitted and the controller may interpret the sensor 150 moving past the end of the rail 165 to indicate x-axis alignment and may utilize the most-recent sensed data from the sensor 150 to determine y-axis alignment. Various additional modifications will be apparent.

Figure 2:
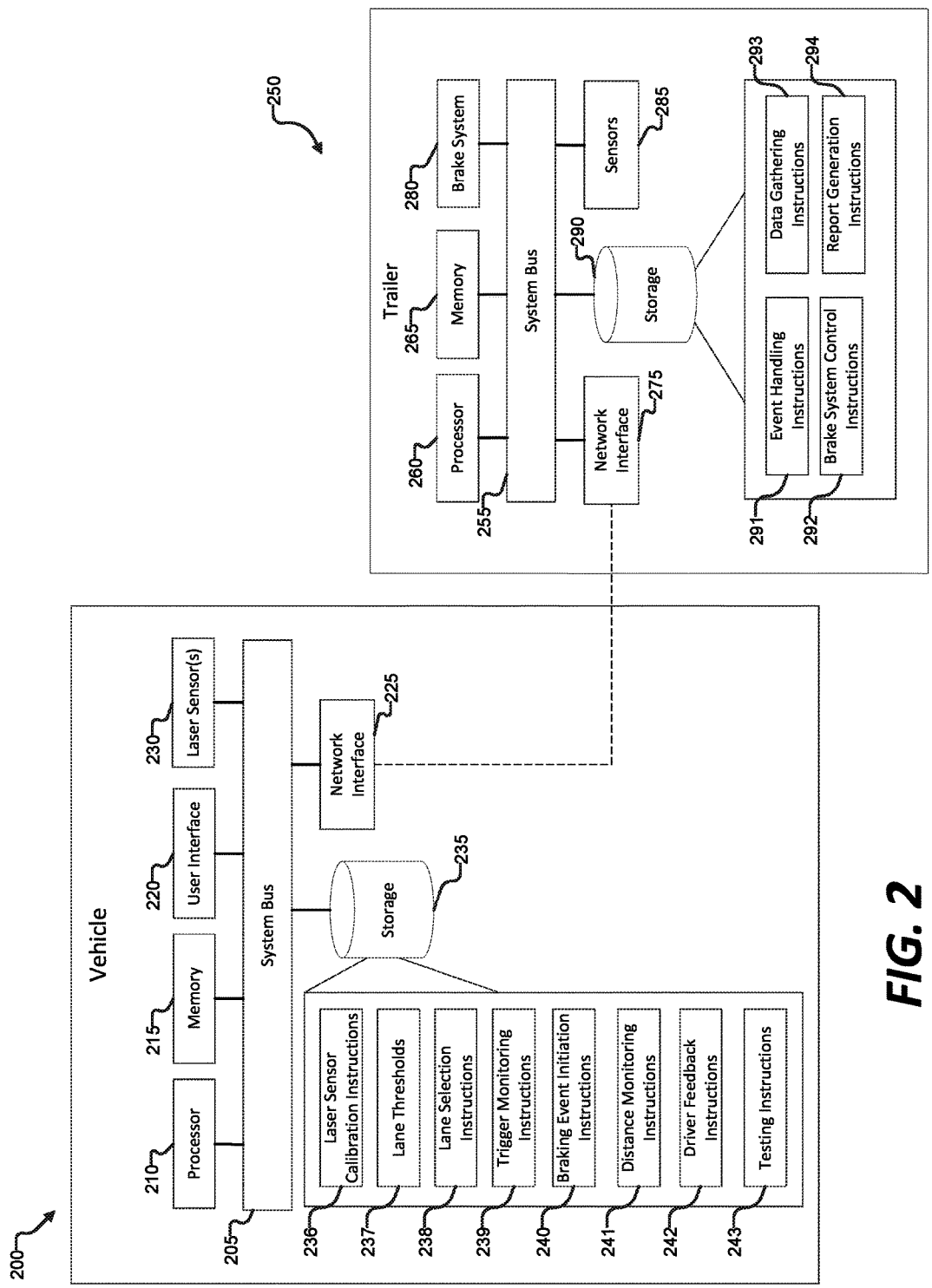
FIG. 2 illustrates an example of two hardware systems configured to cooperate in performing a tire test.

FIG. 2 illustrates an example of two hardware systems 200, 250 configured to cooperate in performing a tire test. The hardware systems 200, 250 may implement a vehicle system 200 and trailer system 250 as described above with respect to the testing system 100 of FIG. 1. As shown, the first device 200 includes a processor 210, memory 215, user interface 220, network interface 225, laser sensor(s) 230, and storage 235 interconnected via one or more system buses 205. Similarly, the second device 250 includes a processor 260, memory 265, network interface 275, brake system 280, sensors 285, and storage 290 interconnected via one or more system buses 255. It will be understood that FIG. 2 constitutes, in some respects, an abstraction and that the actual organization of the components of the devices 200, 250 may be more complex than illustrated.

The processors 210, 260 may each be any hardware device capable of executing instructions stored in the respective memories 215, 265 or storages 235, 290 or otherwise processing data. As such, the processors 210, 260 may include a microprocessor, field programmable gate array (FPGA), application-specific integrated circuit (ASIC), programmable logic controller (PLC), or other similar devices.

The memories 215, 265 may each include various memories such as, for example L1, L2, or L3 cache or system memory. As such, the memories 215, 265 may include static random access memory (SRAM), dynamic RAM (DRAM), flash memory, read only memory (ROM), or other similar memory devices.

The user interface 220 may include one or more devices for enabling communication with a user. For example, the user interface 220 may include a display, a touchscreen, a mouse, and a keyboard for receiving user commands. In some embodiments, the user interface 220 may include a command line interface or graphical user interface that may be presented to a remote terminal via the network interface 225.

The laser sensor(s) 230 may include one or more devices capable of sensing a laser beam and outputting a voltage or other value indicative of a distance to the system bus 205. For example, the laser sensor(s) 230 may correspond to the sensors 150, 160 described with respect to FIG. 1. As noted, in some embodiments, the laser sensor(s) 230 may be mounted to the trailer instead of the towing vehicle 110; in some such embodiments, the laser sensor(s) 230 may additionally or alternatively attach to the system bus 255 of the trailer system 250.

The brake system 280 may include a controllable system for applying brakes to a testing wheel (and consequently, to the tire to be tested attached to the testing wheel). For example, the braking system may be one or more caliper brakes of the trailer capable of being controlled to brake via the system bus 255. In other embodiments, such as embodiments wherein the two devices 200, 250 are combined into a single vehicle system for on-vehicle tire testing, the brake system 280 may be the stock anti-lock brake system (ABS) of the vehicle controllable via the system bus.

The sensors 285 include one or more sensors for gathering data related to a tire test. For example, the sensors 285 may include one or more force sensors for determining vertical, horizontal, and rotational forces applied to the testing wheel. As an additional or alternative example, the sensors 285 may include one or more optosensors configured to track rotation speed of the testing wheel. Various additional sensors useful in performing a tire test will be apparent.

The network interfaces 225, 275 may each include one or more devices for enabling communication with other hardware devices. For example, the network interfaces 225, 275 may include a network interface card (NIC) configured to communicate according to the Ethernet protocol or WiFi protocol. Additionally, the network interfaces 225, 275 may implement a TCP/IP stack for communication according to the TCP/IP protocols. Various alternative or additional hardware or configurations for the network interfaces 225, 275 will be apparent. As shown, the network interfaces 225, 275 are configured to communicate with each other via, for example, a WiFi or Ethernet connection.

The storages 235, 290 may each include one or more machine-readable storage media such as read-only memory (ROM), random-access memory (RAM), magnetic disk storage media, optical storage media, flash-memory devices, or similar storage media. In various embodiments, the storages 235, 290 may store instructions for execution by the respective processors 210, 260 or data upon with the respective processors 210, 260 may operate.

The storage 235 of the vehicle system 200 may include various instructions for achieving the functionality described herein. For example, the storage 235 may include laser sensor calibration instructions 236 for determining thresholds associated with various lanes, for future use in determining y-axis alignment. Such calibrated thresholds 237 may also be stored in the storage 235. Prior to beginning a test, lane selection instruction 238 may be used to allow a user (e.g., the driver) to select a lane within which to perform the test. Then, during test performance, trigger monitoring instructions 239 may monitor the laser sensor 230 output to determine when the tire to be tested is aligned with the desired testing area along the x- and y-axes. When the tire is properly aligned, braking event initiation instructions 240 transmit a braking event to the trailer system 250 via the network interface 225 to begin the tire test. Additionally, distance monitoring instructions 241 may monitor the sensors 230 during approach to determine if the testing wheel is aligned on the y-axis and driver feedback instructions 242 for giving the driver an indication of alignment or misalignment. In some embodiments, the vehicle 200 may further participate in the testing process after sending a braking event and, in such embodiments, the storage 235 also includes further testing instructions 243 for implementing such functionality.

The storage 290 is shown to include event handling instructions 291 for receiving and interpreting events, such as braking events, received from the vehicle system 230 via the network interface 275. Brake system control instructions 292 control the brake system 280 during a test to apply brakes to the testing wheel (e.g., apply brakes for an appropriate period of time). Data gathering instructions 293 gather data from the sensors 285 while the brakes are applied and the report generation instructions 294 interpret the data to calculate figures that are human readable (e.g., mu slip curves).

Various modifications to the two systems 200, 250 will be apparent. For example, where the laser sensor 230 is in communication with the trailer system bus 255, the trailer storage 290 may include the instructions and data 236-241, which will communicate with the driver feedback instructions 242. As another example, the report generation instructions 294 may be omitted and another system (not shown) may be used to interpret the gathered data. As yet another example, where the tire to be tested is mounted to the vehicle itself, the trailer system 250 may be omitted, and the instructions 291-294 may be stored on the storage 235.

It will be apparent that various information described as stored in the storages 235, 290 may be additionally or alternatively stored in the memories 215, 265. In this respect, the memories 215, 265 may also be considered to constitute "storage devices" and the storages 235, 290 may be considered "memories." Various other arrangements will be apparent. Further, the memories 215, 265 and storages 235, 290 may both be considered to be "non-transitory machine-readable media." As used herein, the term "non-transitory" will be understood to exclude transitory signals but to include all forms of storage, including both volatile and non-volatile memories.

While the devices 200, 250 are shown as including one of each described component, the various components may be duplicated in various embodiments. For example, the processor 210 may include multiple microprocessors that are configured to independently execute the methods described herein or are configured to perform steps or subroutines of the methods described herein such that the multiple processors cooperate to achieve the functionality described herein.

Figures 3, 4, 5:
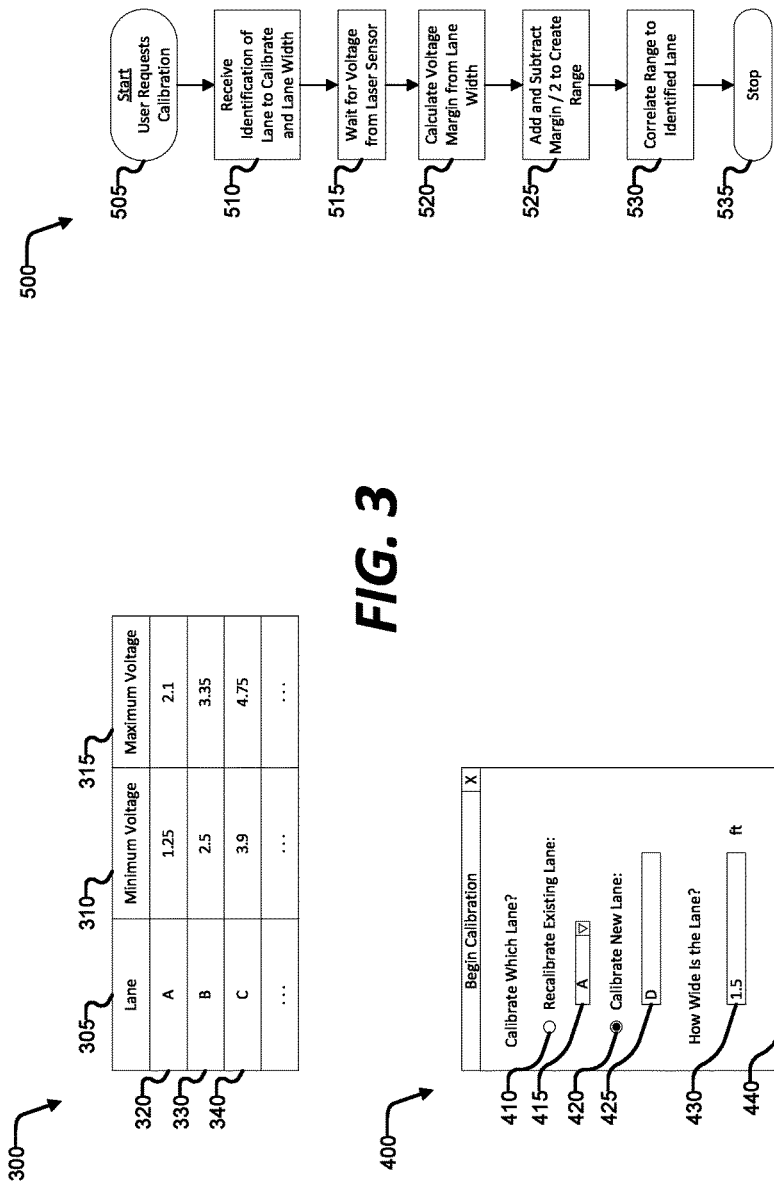
FIG. 3 illustrates an example of a data arrangement for storing lane definitions.
FIG. 4 illustrates an example of a user interface for initiating lane calibration.
FIG. 5 illustrates an example of a method for performing lane calibration.

FIG. 3 illustrates an example of a data arrangement 300 for storing lane definitions. The data arrangement 300 may correspond to the lane thresholds 237 of FIG. 2. As shown, the data arrangement 300 correlates a lane identifier field 305 with a minimum voltage field 310 and a maximum voltage field 315. In other words, each record of the data arrangement 300 specifies for each lane, a range of sensor voltages defining the bounds of the lane. As an example, a first record 320 indicates that a lane identified as "A" exists between the y-axis positions that yield sensor outputs between 1.25-2.1 volts. Similarly, record 330 indicates that lane "B" is correlated to voltage range 2.5-3.35, and record 340 indicates that lane "C" is correlated to voltage range 3.9-4.75. As explained, these values may be used to determine, based on a voltage received from a laser sensor, whether the testing wheel is currently aligned with the desired testing area.

FIG. 4 illustrates an example of a user interface 400 for initiating lane calibration. The user interface may be displayed as part of the laser sensor calibration instructions 326 of FIG. 2. The user interface 400 may be used for a user to indicate which lane is to be calibrated. For example various methods may enable lane calibration while the vehicle and trailer are stationary. According to some such embodiments, the vehicle and trailer may be stopped at a desired distance from the marker and calibration may be initiated to read the current distance to the marker from the laser sensor. This measured distance may then be saved for later use during tire testing. Other methods may calibrate the lane values while the vehicle is in motion and, as such, the interface 400 may indicate which lane is to be calibrated in the upcoming pass. As such, the interface includes input controls for indicating whether an existing lane should be recalibrated 410 or whether a new lane should be created and calibrated 420. When the recalibrate option 410 is selected, a drop down selection 415 enables the user to indicate which existing lane should be recalibrated. For example, based on the example records of FIG. 3, the box 415 may provide as options "A" "B" and "C." the new lane option 420 is selected, a text entry control 425 enables a user to enter a name for the new lane. Another text field 430 allows the user to indicate how wide the new lane will be. As will be seen, this value may be used to compute the voltage/distance range within which the lane exists. In some embodiments, the lane width may be statically implemented and the text field 430 may be omitted. Finally, a begin button 440 is provided to initiate the calibration test.

It will be apparent that various additional fields may be provided to configure the calibration procedure. For example, in embodiments enabling multiple positions for x-axis alignment (e.g., multiple markers or distance tracking along the alignment rail), there may be provided an input control for selecting the x-axis location for calibration. As another example, in some embodiments, the user may be able to manually calibrate a lane without performing a pass and, instead, directly inputting (or modifying previously calibrated values) voltage or distance values to be correlated to the lane label.

FIG. 5 illustrates an example of a method 500 for performing lane calibration. The method 500 may correspond to the laser sensor calibration instructions 326 of FIG. 2. The method 500 begins in step 505 after the user requests a lane calibration by, for example, selecting the begin button 440 of the user interface 400. In step 510, the device receives a lane identification and lane width such as, for example, the values input into the user interface 400. The device then waits, in step 515, to receive voltage from the laser sensor. During this time, the driver is expected to drive past a reflective marker within the desired lane to cause the laser sensor to output a voltage. Various modifications useful to support the various embodiments wherein the sensor may also output voltages based off an alignment rail or non-selected markers will be apparent (e.g., waiting for a gap in voltage or counting markers until the selected marker is encountered).

After receiving voltage data indicative of x-axis alignment, the device begins to derive a voltage range by, in step 520, calculating a voltage margin using the provided lane width. For example, based on known characteristics of the laser sensor, the device may determine what difference in voltage would be expected across the provided lane width. In some embodiments, such as those using sensors that do not have a constant correlation between distance and voltage change at all distances, this calculation may also take into account the actual sensed voltage. In other embodiments, no calculation may be necessary and, instead, the user may have input the voltage margin itself via the interface 400 instead of a lane width. In step 525, the device creates the voltage range with the sensed data at the center by adding and subtracting half of the margin width. For example, if the sensor provided a measured voltage of 1.675V and the margin was computed as 0.85V, the device may produce a range of 1.25-2.1V in step 525. Various alternative methods for computing a voltage range for use in determining y-axis alignment will be apparent. Finally, the device correlates the range to the lane identifier for future use in step 530. For example, the device may modify or create a record in the data structure 300, as appropriate. The method 500 then proceeds to end in step 535.

It will be appreciated that various alternative lane calibration methods may be used. For example, rather than adding a margin to a single measurement, some methods may utilize multiple measurements. In some such embodiments two or more such stationary measurements may be taken to define a testing lane. For example, the vehicle and trailer may first be stopped at the desired left-most position of the lane for a first reading, and then stopped at the desired right-most position of the lane for a second reading. These two readings may then be stored as a distance range defining the extents of the newly-calibrated lane. Various modifications to the methods described herein to achieve such functionality will be apparent.

Figure 6:
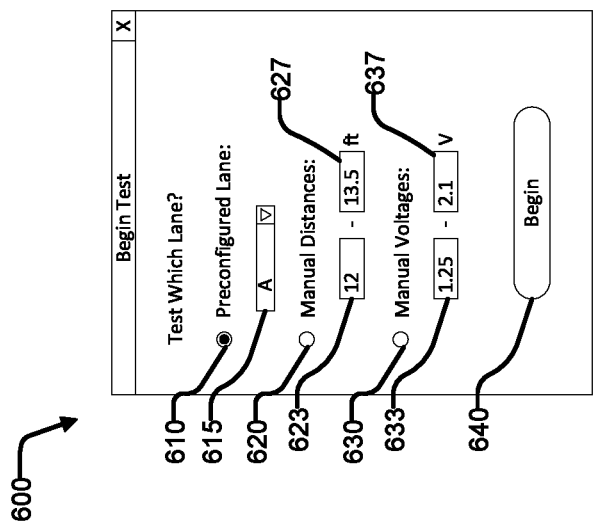
FIG. 6 illustrates an example of a user interface for initiating a tire test.

FIG. 6 illustrates an example of a user interface 600 for initiating a tire test. This interface 600 may be provided as part of the lane selection instructions 238 of FIG. 2. As shown, the interface 600 provides three options 610, 620, 630 for specifying a lane in which to perform a tire test. A first option 610 allows a user to identify a pre-calibrated lane through use of a drop down selection 615. A second option 620 provides two text boxes 623, 627 where the user may manually enter distances from the sensor to be used in triggering the test. In a manner similar to that described above, the device may then calculate the appropriate voltage range using the known characteristics of the laser sensor, laser emitter, laser reflector, etc. As a third option 630, the user may also enter the voltages themselves in two provided text fields 633, 637. The user may then select the begin button 640 to initiate the test.

It will be apparent that various additional fields may be provided to configure the calibration procedure. For example, in embodiments enabling multiple positions for x-axis alignment (e.g., multiple markers or distance tracking along the alignment rail), there may be provided an input control for selecting the x-axis location for calibration.

Figure 7:
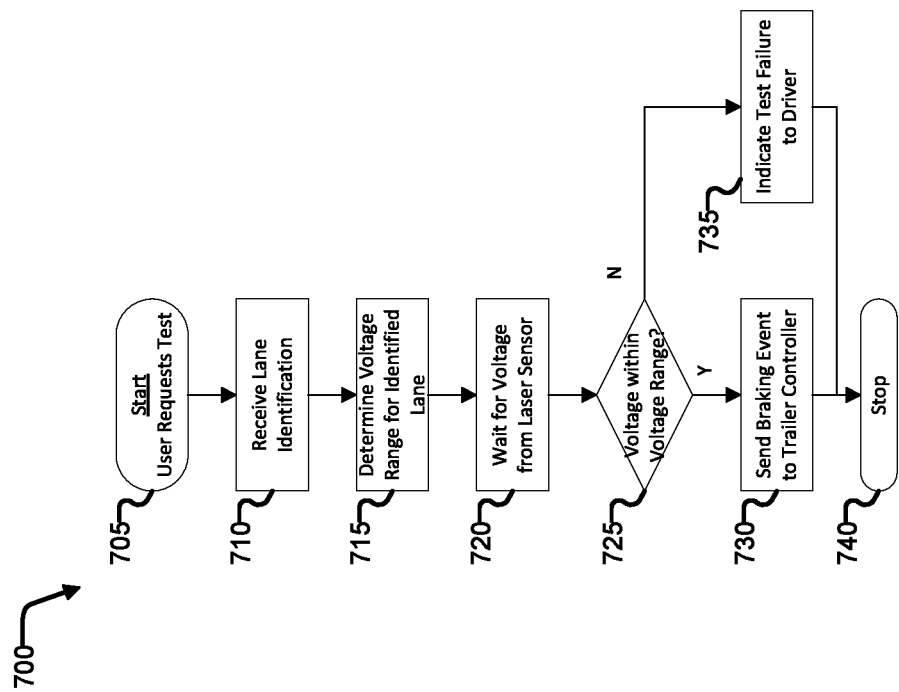
FIG. 7 illustrates an example of a method for initiating a tire test dependent on appropriate tire position.

FIG. 7 illustrates an example of a method 700 for initiating a tire test dependent on appropriate tire position. The method 700 may correspond to the trigger monitoring instructions 239 and braking event initiation instructions 240 of FIG. 2. The method begins in step 705 after the user requests performance of a test by, for example, selecting the button 640 of user interface 600. Then, in step 710, the device receives an identification of a lane to be tested such as, for example, values inputted by the user into the interface 600. Then, in step 715, the device determines the voltage range correlated with the identified lane by, for example, referring to the data arrangement 300 of FIG. 3. It will be apparent that various alternative steps to step 710, 715 may be used to determine the voltage range. For example, where the user provides the voltages manually or provides the range in feet or other distance unit, these steps may be omitted or replaced with appropriate steps for deriving the voltage range. Alternatively, in various embodiments, sensed data will be first converted into a distance and then compared to a distance range instead of a voltage range. Various modifications to each of the methods and systems herein to provide such an alternative comparison will be apparent.

After determining the voltage range, the device waits to receive a voltage from the laser sensor in step 720. During this time, the driver is expected to drive past a reflective marker within the desired lane to cause the laser sensor to output a voltage. Various modifications useful to support the various embodiments wherein the sensor may also output voltages based off an alignment rail or non-selected markers will be apparent (e.g., waiting for a gap in voltage or counting markers until the selected marker is encountered).

After receiving voltage data indicative of x-axis alignment, the device determines, in step 725 whether the sensed voltage falls within the voltage range for the selected lane. If so, the device determines that the testing wheel and tire are aligned with the desired testing area along both the x- and y-axes and transmits a braking event (or other testing event) to the trailer controller in step 730. In response to receiving the braking event, the traction trailer initiates the test. If, however, the voltage is determined to fall outside of the voltage range, the device refrains from sending a testing event and, instead, indicates in step 735 that the test was not performed and that the driver should attempt to drive past the marker again. The method 700 then proceeds to end in step 740. Alternatively, the method may loop from step 735 back to step 720 to allow the drive to continue trying until the test is initiated.

Figure 8:
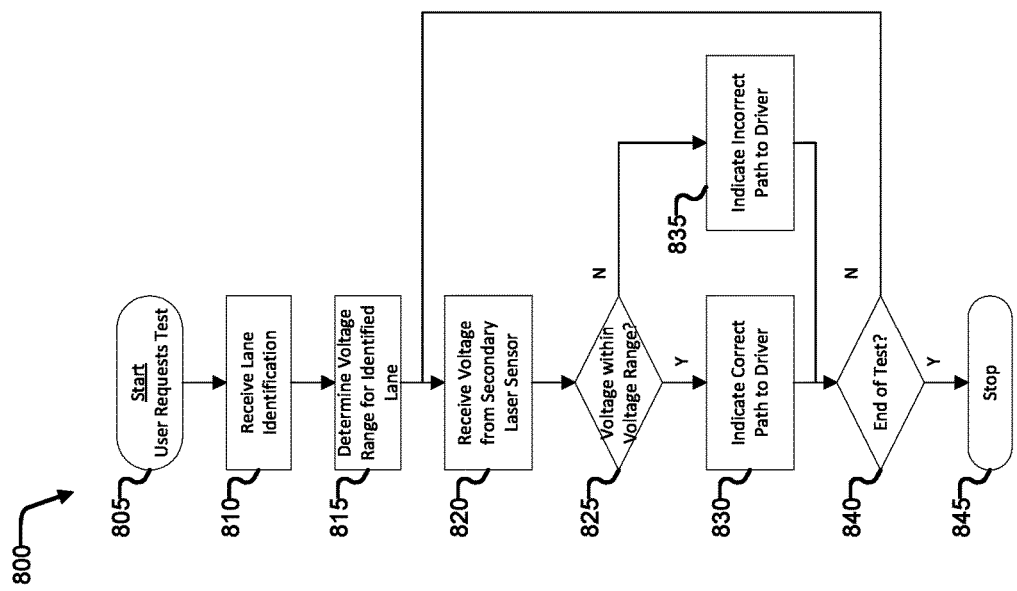
FIG. 8 illustrates an example of a method for providing driver feedback regarding tire position.

FIG. 8 illustrates an example of a method 800 for providing driver feedback regarding tire position. The method 800 may correspond to the distance monitoring instructions 241 and driver feedback instructions 242 of FIG. 2. The method begins in step 805 after the user requests performance of a test by, for example, selecting the button 640 of user interface 600. Accordingly, the method 800 may run parallel to the method for initiating the test 700 as, for example, a separate thread on the same processor. Alternatively, the two methods 700, 800 may begin as a single thread and include some steps (e.g., steps 810, 815) in common and subsequently fork into two or more threads. Various alternative implementations will be apparent.

In step 810, the device receives an identification of a lane to be tested such as, for example, values input by the user into the interface 600. Then, in step 815, the device determines the voltage range correlated with the identified lane by, for example, referring to the data arrangement 300 of FIG. 3. It will be apparent that various alternative steps to step 810, 815 may be used to determine the voltage range. For example, where the user provides the voltages manually or provides the range in feet or other distance unit, these steps may be omitted or replaced with appropriate steps for deriving the voltage range. Alternatively, in various embodiments, sensed data will be first converted into a distance and then compared to a distance range instead of a voltage range. Various modifications to each of the methods and systems herein to provide such an alternative comparison will be apparent.

In step 820, the device receives a voltage from the secondary laser sensor (e.g., laser sensor 160 of FIG. 1). It will be apparent that, in embodiments where a separate sensor is not provided for approach alignment tracking, the step 820 may instead receive a voltage (or other value) from the primary sensor. In step 825, the device determines whether the sensed voltage falls within the range determined in step 815. If so, the device determines that the testing wheel is currently properly aligned on the y-axis and indicates this fact to the driver in step 830. Otherwise, the device indicates, in step 835, that the testing wheel is not currently aligned and, as such, the test will fail unless the alignment is corrected. Step 835 may include providing additional information such as, for example, which direction the driver should correct to achieve y-axis alignment or the wheel's current distance away from y-axis alignment.

After providing the appropriate indication to the driver in step 830 or 835, the device determines whether the test has ended 840. For example, if the method 700 has previously issued a braking event, the device may determine that the testing is over and position tracking no longer need be performed. If so, the method may proceed to end in step 845. Otherwise, if the test is ongoing, the method 800 may loop back to step 820 to continue monitoring y-axis alignment.

Various additional modifications to the systems and methods described herein will be apparent. For example, in some embodiments, method 700, 800 may be modified to gather data for multiple trials in one execution. The user interface 600 may be modified to enable the user to specify a number of trials to be performed and the method 700, 800 may be modified to count the number of successful tests and not proceed to end until the input number of trials have been reached. Additionally, some embodiments may include support for conducting trials each trial in opposite directions such that the driver may pass the marker or rail in either direction, thereby potentially speeding up the process of gathering multiple trials. Various modifications for enabling the system to determine the current direction of the vehicle, to sense the reflective marker regardless of which side of the track it is located (from the perspective of the vehicle), and then to make adjustments for the alternate position of the tire with respect to the sensor when traveling in the opposite direction (e.g., sensor mounted above the testing wheel, additional markers, or tracking a distance traveled from the marker before determining x-axis alignment) will be apparent.

As noted above, it will also be apparent that the systems and methods described herein may be adaptable to virtually any test that is in motion but where proper positioning is important or otherwise useful. For example, in a stopping distance test, a controllable brake actuator may be installed in the vehicle itself and the tire to be tested may be mounted on one or more of the vehicle wheels. In such tests, the systems described herein to determine x- and y-axis alignment may be used to initiate a braking event that controls the brake actuator to engage the ABS system for purposes of the test.

The methods herein may also be used to determine when to initiate testing events other than brake events. For example, a hydroplaning test may involve driving a vehicle at a predetermine speed across wet track and gathering data without applying brakes. The systems described herein may be used to initiate a data gathering event when the vehicle is within a desired testing area while driving over the wet track. Another test is a pass-by noise test in which stationary microphones are positioned beside the track to record noise from the tires as the vehicle passes at a predetermined speed. The methods described herein may be used to transmit a record event to the microphone system when the vehicle is at the desired location. The record event, for example, may be interpreted by the microphone system as an instruction to activate the microphones and begin recording or otherwise processing audio data retrieved therefrom. Another form of test is a blowout test wherein the tire is driven over a blade positioned on the track. The systems used herein may be used to help the driver ensure that the tire to be tested is properly positioned to hit the blade and potentially cause a blowout. Various additional testing contexts for the systems and methods described herein will be apparent.

According to the foregoing, various embodiments provide greater confidence that tire testing is performed in a controlled and repeatable fashion. For example, by providing position sensors on the testing vehicle or other apparatus, a controller can refrain from performing testing when the driver was unable to position the tire to be tested sufficiently close to the area of track where previous testing has occurred or where testing is otherwise desired to occur. Various additional benefits will be apparent in view of the foregoing.

It should be apparent from the foregoing description that various embodiments of the invention may be implemented in hardware. Furthermore, various embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various embodiments have been described in detail with particular reference to certain aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A device for facilitating tire testing, the device comprising:
 a position sensor disposed on a test vehicle and configured to capture position data when a testing wheel is aligned with a desired testing area along a first axis and aligned with the desired testing area along a second axis;
 a processor in communication with the position sensor, wherein the processor is configured to:
 receive the position data from the position sensor when the testing wheel is aligned with the desired testing area along the first axis,
 determine whether the position data indicates that the testing wheel is aligned with the desired testing area along the second axis, the second axis being substantially perpendicular to the first axis, and
 when the position data indicates that the testing wheel is aligned with the desired testing area along the second axis, effect initiation of a testing event.

2. The device of claim 1, wherein the position sensor comprises:
 a laser emitter positioned to impinge a laser beam upon a stationary reflective marker when the testing wheel is:
 traveling along a track containing the desired testing area, and aligned with a desired testing area along the first axis; and
a laser sensor positioned to sense the laser beam when the laser beam is reflected by the stationary reflective marker.

3. The device of claim 1, wherein the testing event is a braking event whereby brakes are applied to the testing wheel.

4. The device of claim 1, wherein, in effecting initiation of a testing event, the processor is configured to transmit an instruction to a second device to initiate the testing event.

5. The device of claim 4, wherein the second device is a controller of a traction trailer comprising the testing wheel.

6. The device of claim 4, wherein the device is a vehicle further comprising:
the testing wheel; and
a braking system,
wherein the second device is an on-vehicle braking actuator.

7. The device of claim 1, wherein, in determining whether the position data indicates that the testing wheel is aligned with the desired testing area along the second axis that is perpendicular to the first axis, the processor is configured to:
determine a value range associated with the desired testing area; and
determine whether the position data falls within the value range.

8. The device of claim 1, further comprising a driver display device, wherein:
the position sensor is further configured to provide approach position data over a distance as the testing wheel approaches the desired testing area; and
the processor is further configured to:
determine whether the approach position data indicates that the testing wheel is aligned with the desired testing area along the second axis, and
provide an indication to the driver via the driver display device whether the testing wheel is aligned with the desired testing area along the second axis.

9. The device of claim 8, wherein the position sensor comprises:
a laser emitter positioned to impinge a laser beam upon a stationary reflective rail when the testing wheel is:
traveling along a track containing the desired testing area, and
approaching alignment with a desired testing area along the first axis; and
a laser sensor positioned to sense the laser beam when the laser beam is reflected by the stationary reflective rail.

10. The device of claim 1, wherein the testing wheel is configured to travel with the position sensor.

11. A method performed by a device for facilitating tire testing, the method comprising:
capturing position data from a position sensor, wherein the capture of the position data is indicative of alignment with the desired testing area along a first axis and alignment with the desired testing area along a second axis;
determining whether the position data indicates that the testing wheel is aligned with the desired testing area along the second axis, the second axis being substantially perpendicular to the first axis, and
when the position data indicates that the testing wheel is aligned with the desired testing area along the second axis, effecting initiation of a testing event.

12. The method of claim 11, wherein the step of capturing the position data comprises:
capturing position data from a laser sensor positioned to sense a laser beam emitted by a laser emitter and reflected by a stationary reflective marker when the testing wheel is:
traveling along a track containing the desired testing area, and
aligned with a desired testing area along the first axis.

13. The method of claim 11, wherein the testing event is a braking event whereby brakes are applied to the testing wheel.

14. The method of claim 11, wherein the step of effecting initiation of a testing event comprises transmitting an instruction to a second device to initiate the testing event.

15. The method of claim 14, wherein the second device is a controller of a traction trailer comprising the testing wheel.

16. The method of claim 14, wherein the second device is an on-vehicle braking actuator.

17. The method of claim 11, wherein the step of determining whether the position data indicates that the testing wheel is aligned with the desired testing area along the second axis that is perpendicular to the first axis comprises:
determining a value range associated with the desired testing area; and
determining whether the position data falls within the value range.

18. The method of claim 11, further comprising:
receiving, from the position sensor, approach position data over a distance as the testing wheel approaches the desired testing area;
determining whether the approach position data indicates that the testing wheel is aligned with the desired testing area along the second axis, and
providing an indication to the driver via a driver display device whether the testing wheel is aligned with the desired testing area along the second axis.

19. The method of claim 18, the step of receiving approach position data comprises:
receiving approach position data from a laser sensor positioned to sense a laser beam emitted by a laser emitter and reflected by a stationary reflective rail when the testing wheel is:
traveling along a track containing the desired testing area, and
approaching alignment with a desired testing area along the first axis.

20. The method of claim 11, wherein the testing wheel is configured to travel with the position sensor.

* * * * *